July 29, 1958   A. J. J. FRANKEN ET AL   2,845,540
APPARATUS FOR USE WITH CORPUSCULAR RAYS Filed March 4, 1955   2 Sheets-Sheet 1

INVENTORS
ADRIANUS JACOBUS JOZEF FRANKEN
ADRIANUS VERHOEFF
BY
AGENT

July 29, 1958   A. J. J. FRANKEN ET AL   2,845,540
APPARATUS FOR USE WITH CORPUSCULAR RAYS
Filed March 4, 1955   2 Sheets-Sheet 2

INVENTOR
ADRIANUS JACOBUS JOZEF FRANKEN
ADRIANUS VERHOEFF
BY

AGENT

United States Patent Office 2,845,540
Patented July 29, 1958

2,845,540

APPARATUS FOR USE WITH CORPUSCULAR RAYS

Adrianus Jacobus Jozef Franken and Adrianus Verhoeff, Emmasingel, Eindhoven, Netherlands, assignors, by mesne assignments, to North American Philips Company, Inc., New York, N. Y., a corporation of Delaware Application March 4, 1955, Serial No. 492,188

Claims priority, application Netherlands March 9, 1954

4 Claims. (Cl. 250—49.5)

In apparatus for microscopy by means of corpuscular rays provision is usually made of a holder in which an object carrier can be arranged. This holder is slightly movable so that the point at which the image forming ray beam intersects with the object is variable. The fact that the object is adapted to be moved in the direction of the rays enables the image distance of the image-forming lens to be varied.

Devices are known in which the object holder is shaped in the form of a two-armed lever the fulcrum of which is situated in a flexible connection to the wall of the discharge vessel. Such apparatus requires the provision of an aperture in the wall through which the object can be introduced in the discharge space. In some cases a separate aperture is provided for this purpose, for example opposite the point at which the object holder passes through the wall. As an alternative, the holder may be secured in the wall so as to be detachable and the object carrier can be removed from the apparatus together with the holder.

Apparatus is also known in which the object carrier is introduced into the evacuated discharge space by means of an air lock. The wall of such apparatus has separate apertures formed in it in which the members for moving the object holder are arranged, so as to be adapted to move in a manner such as to prevent leaking.

It is an object of the invention to provide a simple construction of an object holder arranged so as to be adapted to move. According to the invention, in an apparatus for use with corpuscular rays the object holder is adapted to move in a manner such that the object can be adjusted accurately with respect to the ray beam. The novel feature of this object holder lies in the fact that the holder is arranged outside the vacuum space and engages movable supports separately from the annular or tubular flexible airtight connection of the holder to the wall of the apparatus and also comprises an air-lock arranged so as to be coaxial with this connection through which air-lock the object carrier passes.

In a particularly advantageous embodiment the object holder consists of a metal block which is provided with a bore communicating with the discharge spaced and comprising an airlock (for the object carrier) and with two feet arranged symmetrically with respect to the bore and each gripped between a resilient support and an adjusting screw. By means of a tube which is coaxial with the bore and seals the vacuum the block is connected to the body of the apparatus in which the resilient support are also arranged. This tube is shaped in the form of a metal bellows or is made of rubber or a similar flexible resilient material. By means of the two adjusting screws which are arranged in a plane at right angles to the axis of the ray beam the supports can be moved in a direction parallel to the axis of the bore. Thus, the object is adapted to be moved in two coordinate directions at right angles to the ray beam.

If the said two support exhibit a restricted contact surface the block is pivotable about their joining line. In order to cause the block to effect this pivoting movement provision can be made of a third adjusting screw which causes a movement at right angles to the plane of the other two adjusting screws.

The fact that the block is connected to the body of the apparatus by means of a flexible tube permits of a movement of the object in three coordinate directions which is slight but sufficient for adjustment whilst maintaining completely the exclusion of the ambient atmosphere from the evacuated space.

The invention will now be described more fully with reference to the accompanying drawing in which.

Figure 1:
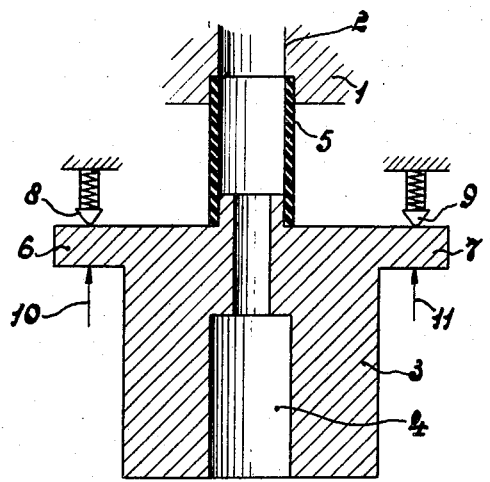
Fig. 1 shows the main features of the construction of the novel object holder.

Referring now to Fig. 1, reference numeral 1 designates a part of the body of an apparatus for corpuscular rays, for example an electron microscope. A duct 2 communicates with the discharge space required to be evacuated. The object holder or support shaped in the form of a block 3 is surrounded by the ambient atmosphere. The block has a bore 4 formed in it to which a rubber tube 5 is connected which opens into the duct 2. In the bore an object carrier (not shown in Fig. 1) can be arranged.

The block 3 comprises two feet 6 and 7 which engage resilient supports 8 and 9. Adjusting screws which enable the feet to be moved towards and from the vessel 1 exert pressure on the feet in the direction of the arrows 10 and 11. The rubber tube 5 permits this movement while at the same time maintaining the exclusion of the ambient atmosphere from the the duct 2.

Figure 2:
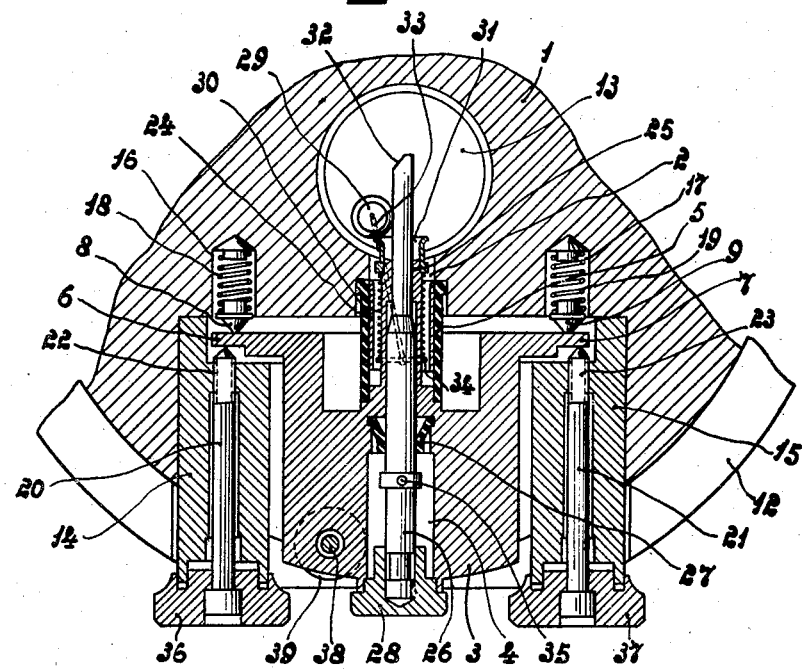
Fig. 2 is in greater detail a cross-sectional view taken along a plane passing through the adjusting screws and the bore axis, that is a plane at right angles to the ray beam, of a completed holder.
Figure 3:
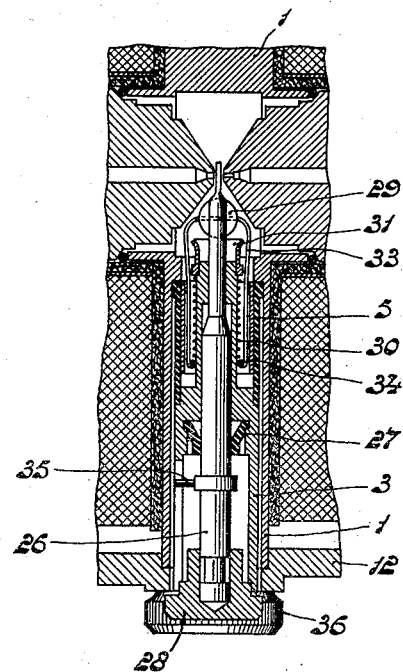
Fig. 3 is a fragmentary partial cross-sectional and elevational view taken at right angles to the plane of the drawing of Fig. 2.
Figure 4:
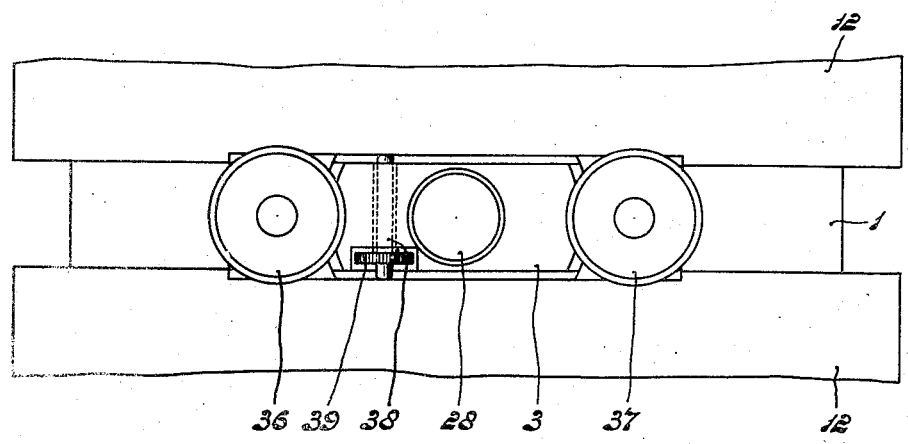
Fig. 4 is a front elevational view of the device shown in Fig. 2.

In Fig. 2 like elements are designated by corresponding reference numerals. A portion of the cylindrical outer wall of the apparatus is designated 12. This cylinder has a partition 1 comprising a central aperture 13 through which the beam of corpuscular rays (in the case of an electron microscope an electron beam) passes in a direction at right angles to the plane of the drawing.

The cylinder 12 and the partition 1 have a rectangular recess formed in them. In this recess two spacing members 14 and 15 are secured by screws (not shown) after the block 3 has been arranged in it. The bottom of the recess has apertures 16 and 17 bored in it. In these apertures compression springs 18 and 19 are arranged on which studs 8 and 9 are arranged. The springs urged these studs against the feet 6 and 7. On the other side these feet are urged by the adjusting screws 20 and 21 which are screwed in the spacing members 14 and 15 at 22 and 23.

The block is connected to the partition 1 by means of a rubber tube 5 in a manner such that the tube is a continuation of the duct which communicates with the central aperture 13. A metal insertion tube 24 prevents the atmospheric pressure from flattening the tube 5. Through the tube 5 a sheath 25 secured to the block passes which sheath is a continuation of the bore 4 in the block 3. It extends into the duct 2 and accommodates the object carrier 26. The latter is guided by a rubber ring 27 which prevents the penetration of air between the object carrier and the inner wall of the sheath 25.

The object carrier can be removed from the holder by means of a knob 28. When the object holder has been pulled out to such an extent that the top to which the object is secured is about to disappear in the sheath 25, a roller 29 which is pulled by a spring 30 falls onto a seating 31. Thus, the roller seals the mouth of the sheath in an airtight manner. Consequently, the object carrier 26 can be removed from the holder 3 without air flowing into the evacuated space 13. If the object carrier is replaced in the holder, the bevelled edge 32 of the holder urges the roller from the seating. The roller slides to the left along the edge 32 and again assumes the shown position. By means of a metal wire strap 33 which is passed through an aperture in the roller the latter is connected to a ring 34 which is slidably arranged on the outer surface of sheath 25 and by means of a spring 30 extending between the ring 34 and the seating 31 is urged to the position in which the roller occupies the position in the seating 31.

A stud 35 arranged on the object carrier and guided in a groove recessed in the bore 4 ensures that the object carrier can only be moved into the airlock in a single position and can not be rotated.

If the object is to be moved in the direction of the axis of the object carrier, knobs 36 and 37 to which the adjusting screws 20 and 21 are secured are rotated through an equal angle so that the adjusting screws are moved through the same distance in the nuts 22 and 23. If the object is to be moved in a direction of the plane of the drawing at right angles to the axis of the object carrier, one adjusting screw is screwed slightly forward and/or the other is screwed slightly back. The springs 18 and 19 ensure that the feet 6 and 7 follow the movement of the adjusting screws when these are screwed back.

In the block 3 a third adjusting screw 38 is arranged at right angles to the plane of the other two screws. This adjusting screw engages the wall of the recess formed in the body 1 and carries a disc 39 arranged in a recess formed in the block 3. The edge of this disc slightly projects beyond the block 3 so that the disc can be rotated with a fingertip and consequently the block 3 can be moved. In this event the block pivots about the line joining the supports 8 and 9 with the result that, if the outer side of the block 3 advances, its top goes back. Obviously, this allows of slight movements only but for adjusting the object, for example in order to adjust the object distance of the image forming lens, only small movements are required.

Since (in contradistinction to known constructions) the sealing roller 29 is supported from the object holder, a satisfactory seal is ensured at all times irrespective of the momentary position of the movable object holder.

What is claimed is:

1. An electron-optical apparatus comprising an evacuated enclosure, a movable object carrier having at least part thereof outside said enclosure, a rigid support for said object carrier mounted on said apparatus but outside said enclosure and movable in a direction substantially parallel to said object carrier, said support being provided with a bore, an air-tight connection and an air-lock extending co-axially therewith communicating said evacuated enclosure with said bore.

2. An electron-optical apparatus comprising an evacuated enclosure, a movable object carrier having at least part thereof outside said enclosure, a rigid support for said said object carrier mounted on said apparatus but outside said enclosure and movable in a direction substantially parallel to said object carrier, said support being provided with a bore and two extensions extending radially from said support, spring-urged means engaging a surface of each of said extensions, a pair of adjusting screws each engaging another surface of adjacent extensions, and a tube co-axial with said bore and communicating said evacuated enclosure with said bore.

3. An electron-optical apparatus as set forth in claim 2 further comprising a third adjusting screw for pivoting said support about the imaginary line connecting said spring-urged means.

4. An electron-optical apparatus as set forth in claim 2 further comprising a sealing valve for said tube, and resilient means connecting said valve to said object carrier whereby said valve is normally urged into a position closing said tube.

References Cited in the file of this patent

UNITED STATES PATENTS

| | | |
|---|---|---|
| 2,220,973 | Marton | Nov. 12, 1940 |
| 2,464,382 | Dornfeld | Mar. 15, 1949 |
| 2,655,601 | Verhoeff | Oct. 13, 1953 |